H. JEROME.
Link Machine.
No. 233,768. Patented Oct. 26, 1880.
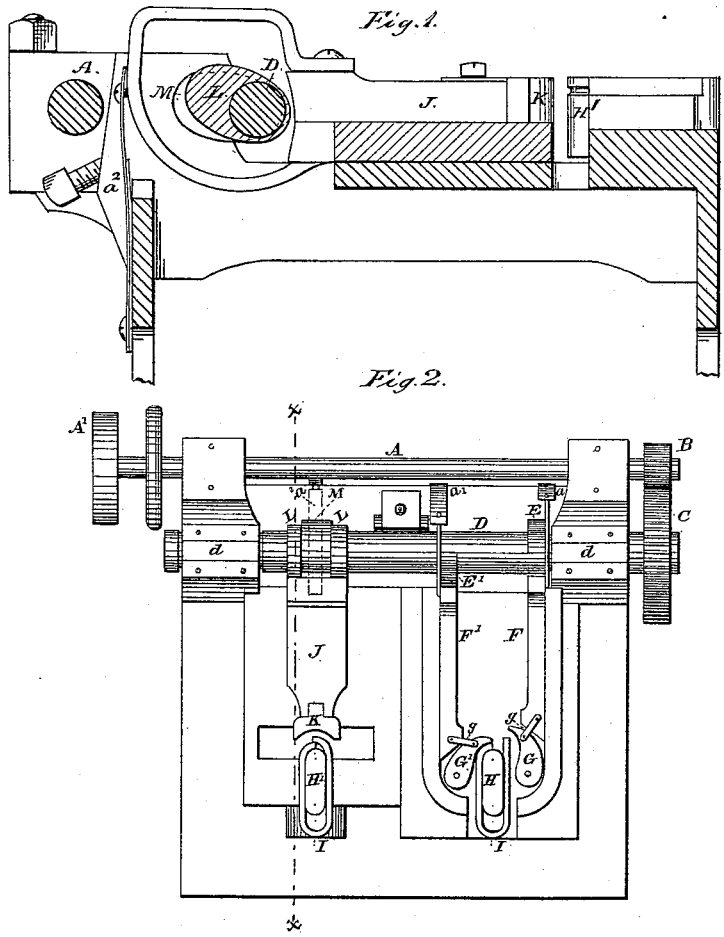
Witnesses  
Wm H Kidd  
J. F. Tallant
Henry Jerome, Inventor,
By Geo. E. Tracy & Co.  
Attorneys

UNITED STATES PATENT OFFICE.

HENRY JEROME, OF CLEVELAND, OHIO.

LINK-MACHINE.

SPECIFICATION forming part of Letters Patent No. 233,768, dated October 26, 1880.

Application filed December 15, 1879.

*To all whom it may concern:*

Be it known that I, HENRY JEROME, of Cleveland, in the county of Cuyahoga and State of Ohio, have invented a new and useful Improvement in Link-Machines; and I do hereby declare that the following is a full and exact description of the same, reference being had to the accompanying drawings, and to the letters of reference marked thereon.

My invention relates to certain improvements in machines for making links such as are used in coupling railway-cars or for similar purposes, where an elliptical link is used, and has for its object such combination of parts as will effect the desired end in the most expeditious and simple manner.

In the drawings, Figure 1 is a sectional side elevation of my link-machine on the line of the left-hand cam L, and Fig. 2 is a plan view of my link-machine.

A is a shaft, operated by the pulley A' and its proper belt, and, through the cog-wheel B, meshing into the larger cog-wheel C, for the purpose of multiplying power in turning the shaft D, which runs in bearings $d$ $d$. At E E' upon this shaft are eccentrics or cams, situated upon opposite sides of the shaft, and consequently acting alternately as the shaft revolves.

F F' are levers or sliding arms, connected to the movable jaws G G' by links $g$ $g$. These levers or sliding arms are wedge-shaped, and move the jaws G G' inward, when they are advanced by cams E E'. The office of the links $g$ $g$ is to open the jaws when the sliding arms retreat.

The cam E' is shown bearing upon the arm F', and causing the jaw G' to bend the end of the link I upon the die or former H.

The continuation of the revolution of the shaft D will withdraw the cam E' from contact with the arm F', when said arm will be drawn back by the spring $a'$. At the same time the cam E will bear against and act in a similar manner upon the arm F, causing the jaw G to bend the other end of the link upon the die, thus completing the elliptical form of the link, with its two ends resting one upon the other, ready for welding together. The link is then lifted from the die H, and, being heated to a welding heat, it is placed upon the die H', where the welding is completed by the counter-die K, connected to the pitman or plunger J, which is moved forward, slowly at first, by the cams L L, so as to press the two ends of the blank into proper shape, and then by cam M, which, having an abrupt taper from its conformation with the shaft to its greatest diameter, as shown in Fig. 1, operates to throw the pitman or plunger J forward more quickly and impart a powerful and continuous pressure upon the ends of the blank, welding them together in a quick, strong, and durable manner. The further revolution of the shaft releases the cam from the plunger, and it is drawn back by the spring $a^2$ and the completed link removed from the die.

It will be seen that my invention is at once simple and effective, doing away with unnecessary and frequent handling of the link during the operation of bending and welding the ends, and the ends being bent one upon another, a much stronger weld is effected than by their arrangement in any other position.

Having thus described my invention, what I claim as new, and desire to secure by Letters Patent, is—

The combination of the die H, pivoted jaws G G', the arms F F', wedge-shaped at their lower ends and joined to the jaws by links $g$ $g$, and the cams E E', mounted at right angles to one another upon the driving-shaft, and thus operating the arms F F' alternately, substantially as and for the purpose set forth.

This specification signed and witnessed this 18th day of November, 1879.

HENRY JEROME.

Witnesses:
 GEO. C. TRACY,
 N. H. FOOTE.